United States Patent [19]

Hashimoto

[11] Patent Number: 5,452,342

[45] Date of Patent: Sep. 19, 1995

[54] TELEPHONE TERMINAL DEVICE WITH FUNCTION FOR PREVENTING UNNECESSARY UTILIZATION OF TELEPHONE LINE BY UNSOLICITED FACSIMILE SIGNAL

[75] Inventor: Kazuo Hashimoto, Tokyo, Japan

[73] Assignee: Hashimoto Corporation, Tokyo, Japan

[21] Appl. No.: 225,482

[22] Filed: Mar. 31, 1994

[30] Foreign Application Priority Data

Apr. 2, 1993 [JP] Japan ................... 5-098369

[51] Int. Cl.⁶ .......................................... H04M 11/00
[52] U.S. Cl. ......................... 379/100; 379/74; 379/77; 379/102
[58] Field of Search ................ 379/100, 93, 96–99, 379/80, 74, 77, 102

[56] References Cited

U.S. PATENT DOCUMENTS

| | | | |
|---|---|---|---|
| 4,800,439 | 1/1989 | Yoshino | 379/100 |
| 4,939,772 | 7/1990 | Goto | 379/100 |
| 5,014,296 | 5/1991 | Saigano | 379/100 |
| 5,073,921 | 12/1991 | Nomura et al. | 379/100 |
| 5,086,455 | 2/1992 | Satomi et al. | 379/100 |
| 5,151,972 | 9/1992 | Lorenz et al. | 379/93 |
| 5,267,301 | 11/1993 | Nishii | 379/100 |

*Primary Examiner*—Wing F. Chan
*Attorney, Agent, or Firm*—Lowe, Price Leblanc & Becker

[57] ABSTRACT

In a telephone terminal device, for example, a telephone answering device, when the device receives an inadvertent facsimile signal while it is in operation, the telephone line is disengaged via a facsimile signal detecting means for the purpose of preventing unwanted utilization of the telephone line and unnecessary consumption of the recording medium.

7 Claims, 4 Drawing Sheets

TELEPHONE TERMINAL DEVICE WITH FUNCTION FOR PREVENTING UNNECESSARY UTILIZATION OF TELEPHONE LINE BY UNSOLICITED FACSIMILE SIGNAL

BACKGROUND OF THE INVENTION

The present invention relates to a telephone terminal device which prevents the unnecessary utilization of a telephone line when inadvertent facsimile signals are received at a telephone answering device (TAD).

Heretofore, with a conventional TAD, the arrival of an inadvertent facsimile signal was a considerable annoyance to the called party. Until the signal ceased, the phone line was unnecessarily engaged and, in the case of a TAD, the recording medium was wasted needlessly.

SUMMARY OF THE INVENTION

In the above-mentioned terminal device of this invention, engagement of the telephone line in response to unwanted incoming facsimile signals, for example calling (CNG) tones or handshaking signals, is released via a detection means. This invention prevents not only inconvenient engagement of phone lines by unwanted facsimile signals, but unnecessary consumption of the recording medium as well.

[LEGEND]
1=CPU
2=Operation key unit
3=Microphone
4=Amplifier circuit
5=OGM recording and playback unit
6=Line monitoring circuit
7=Amplifier circuit
8=Amplifier circuit
9=Reverse amplifier circuit
10=Adder amplifier circuit
11=Zero cross switch
12=ICM recording and playback unit
13=Speaker
14=Telephone

DESCRIPTION OF THE PREFERRED EMBODIMENT

Figure 1:
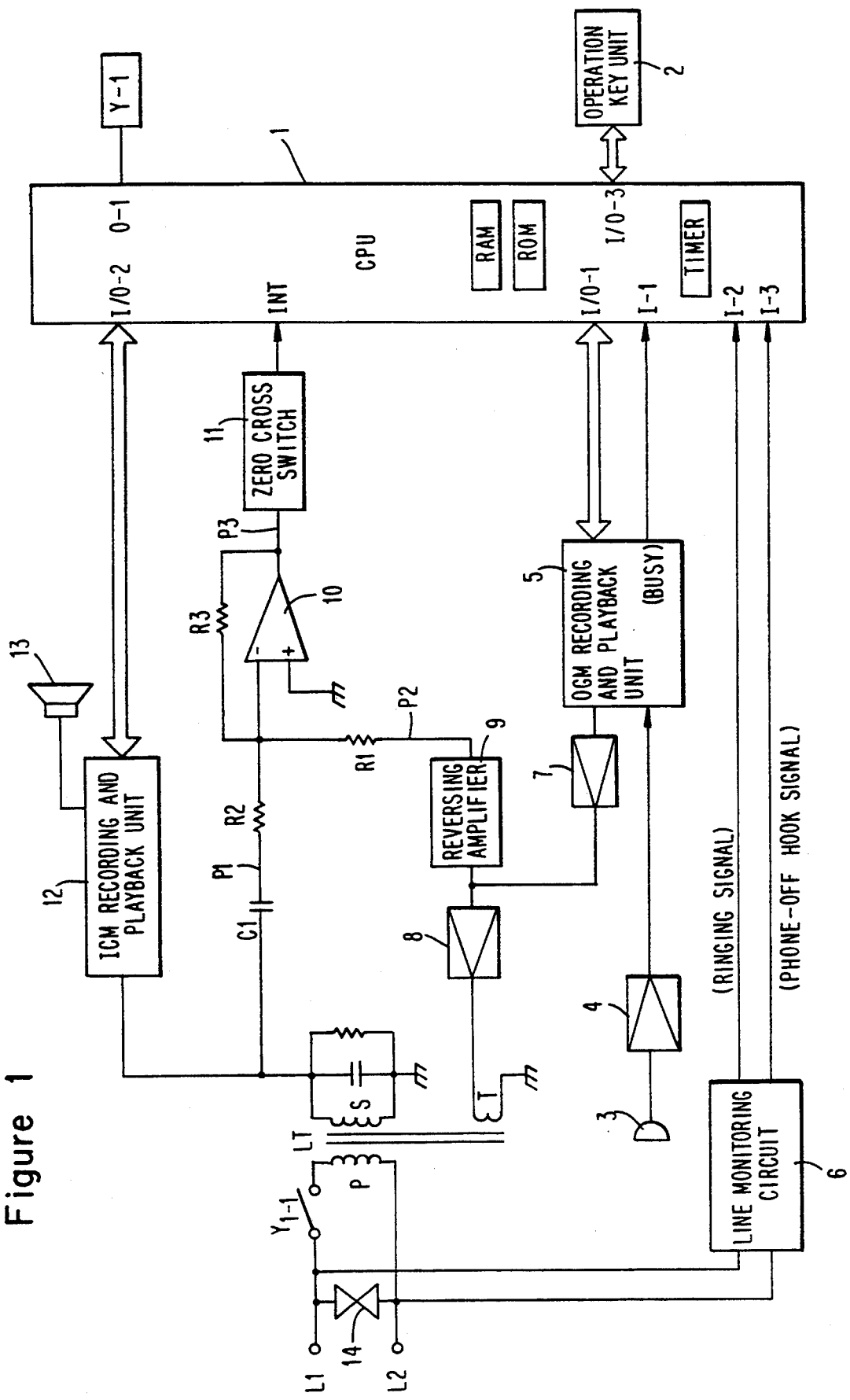
FIG. 1 is a block diagram illustrating an embodiment of the present invention.

FIG. 1 is a block diagram which illustrates an embodiment of the present invention. Numeral 1 is a microprocessor (CPU). Built into this microprocessor are a ROM into which the program is stored, a RAM for processing and a timer, which performs timing operations. Reference symbol INT is an interrupt terminal. Reference symbols I/O-1 through I/O-3 refer to input-/output ports, I-1 through I-3 to input ports, and O-1 to an output port.

Numeral 2 is an operation key unit containing such keys as an outgoing message (OGM) recording key, a playback key, an incoming message (ICM) playback key and answering mode key. Numeral 3 is a microphone for recording outgoing messages. Numeral 4 is an amplifier circuit. Numeral 5 is an OGM recording and playback unit which utilizes an integrated circuit memory. Reference symbol "BUSY" terminal transmits a H (high) level signal when the OGM recording and playback section is in operation.

Numeral 6 is a line monitoring circuit which detects ringing signals and the off-hook status of telephone 14. Numerals 7 and 8 are amplifier circuits. Numeral 9 is a reverse amplifier circuit. Numeral 10 is an adder amplifier circuit which utilizes an operational amplifier. When audio signals at P1 and P2 shown in FIG. 1 are 180 degrees out of phase, they cancel each other via resistors R1 and R2, thereby attenuating the OGM signal at P3. This technique is already well-known to public. Numeral 11 is a zero cross switch for converting the voltage level of output from the above adder amplifier circuit 10 into that of digital signal. Numeral 12 is an ICM recording and playback unit which utilizes an integrated circuit memory. Note that a recording medium such as magnetic tape may also be utilized. Numeral 13 refers to an ICM loudspeaker and 14 to a telephone set. Reference symbols Y-1 and LT refer to a relay and a line transformer, respectively.

Figure 2:
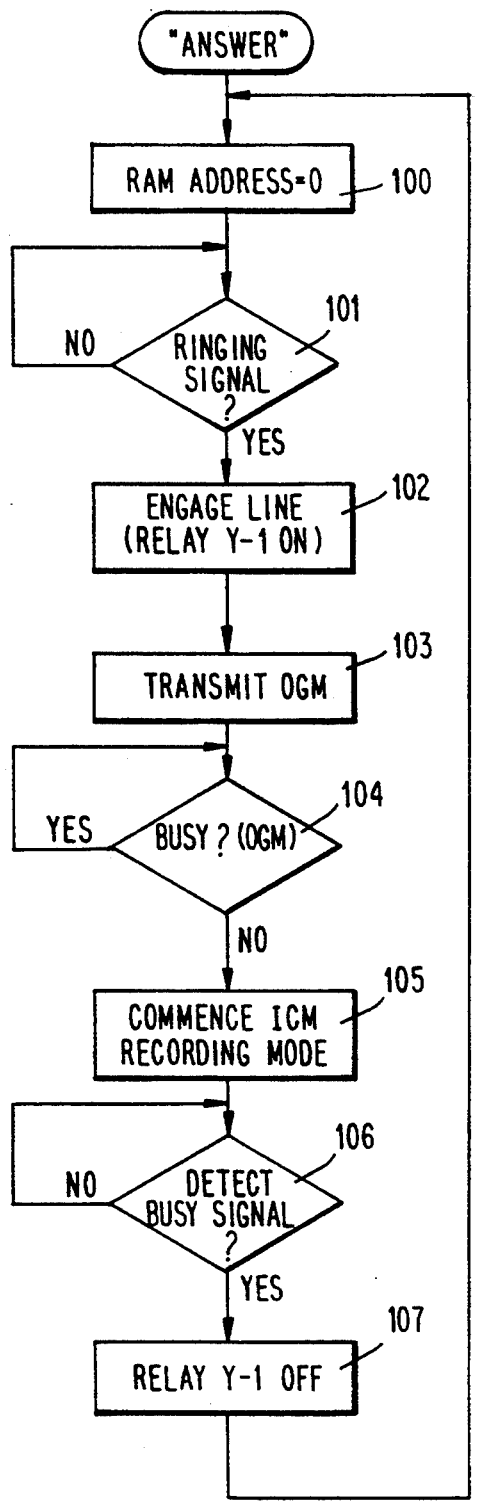
FIG. 2 is a flowchart illustrating operation as a TAD.
Figure 3:
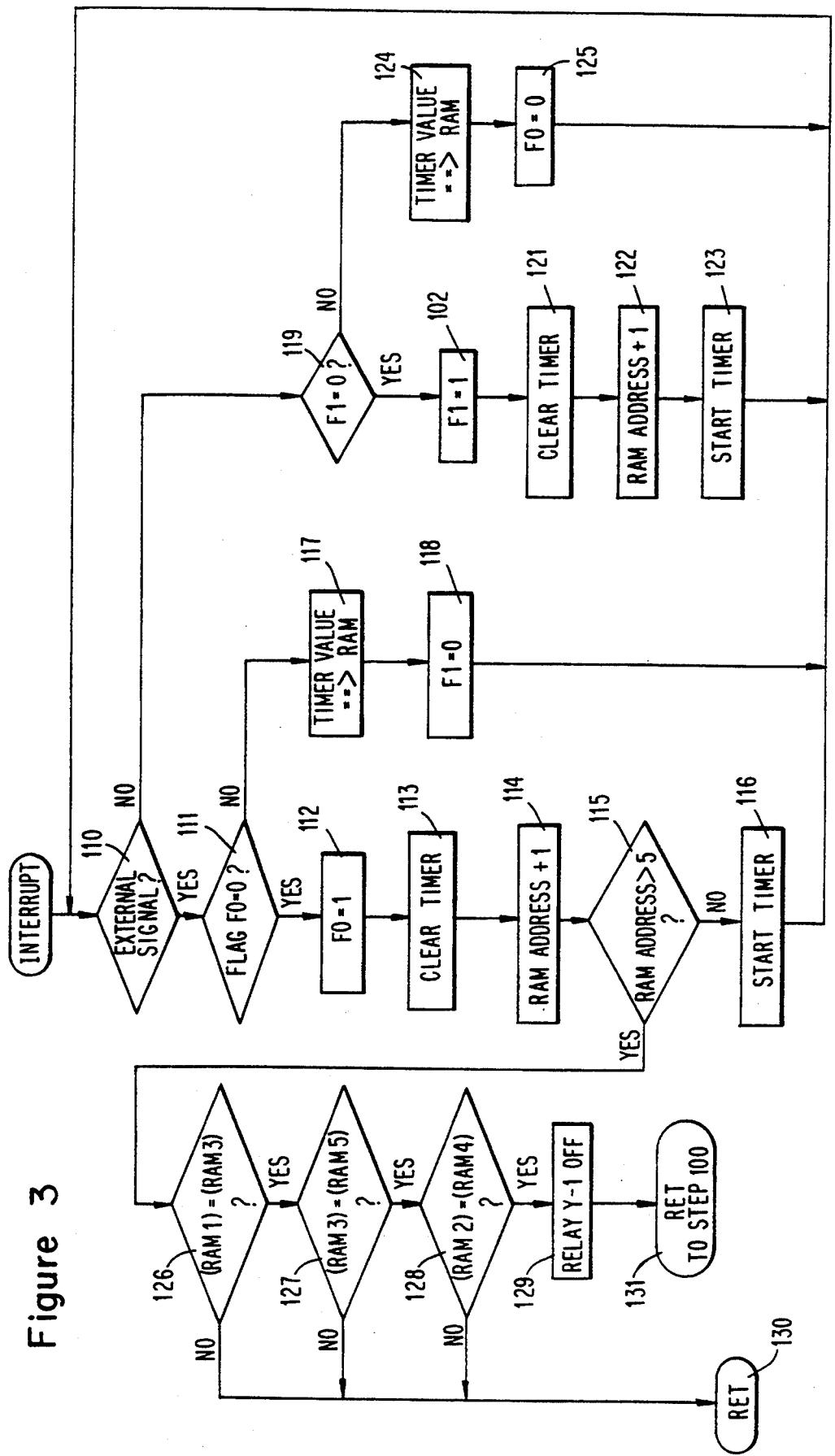
FIG. 3 is a flowchart illustrating how periodic signals such as CNG tones from facsimile machines are recognized.

Next a detailed explanation is provided with reference to the flowcharts of FIGS. 2 and 3. First is a description of TAD functions. An outgoing message will have been previously recorded in OGM recording and playback unit 5. The "answer mode" key (not shown in drawings) of operation key unit 2 will have been pressed.

Referring to the flowchart of FIG. 2, at Step 100 the address of a processing RAM is initialized, for example, to a value of zero. At Step 101, the device awaits the arrival of a ringing signal.

A ringing signal from a caller on L1 and L2 of the telephone line is detected by the program via line monitoring circuit 6 and input port I-2. Consequently, Step 101 is affirmative. At Step 102, the relay Y-1 is turned on. The telephone line (L1 ,L2) is engaged via line transformer LT and relay contact y1-1. Accordingly, the ringing signal stops and conversation between the caller and the called party commences.

At Step 103, an OGM is replayed by OGM recording and playback unit 5 in response to a start command from input/output port I/O-1. This OGM is transmitted over the telephone line (L1,L2) via amplifier circuits 7 and 8 and line transformer LT. During transmission of this OGM, the BUSY terminal of OGM recording and playback unit 5 is at a high (H) level. When the OGM is concluded, the BUSY terminal drops to a low (L) level. Since a low (L) signal provides a negative response to Step 104, control proceeds to Step 105. At Step 105, the device switches to incoming message recording mode.

When the caller places the telephone set (not shown in the drawings) on hook after sending his/her message, a busy tone (in Japan) which is sent from the telephone exchange (not shown in the drawings) arrives at the present device. When this busy tone is detected at Step 106, relay Y-1 goes off at Step 107. This releases the engagement of the telephone line (L1,L2). The present device is then reset to standby mode at Step 101 via Step 100.

Recently, due to the recent popularization of facsimile machines, the number of inadvertent and unwanted facsimile transmissions is rising. Such facsimile transmissions may be due to incorrect telephone numbers stored in the auto-dialers of facsimile machines or simply because of inaccurate manual dialing. Also, recent model facsimile machines include phone answering functions and there are an increasing number of people who persist in sending advertisements via facsimile even though they may hear an outgoing message.

The reception of these kind of facsimile transmissions wears out the recording medium of the phone answering machine over time and engages the phone line unnecessarily. It is also a considerable nuisance to the called subscriber who is at home.

In the present invention, when a facsimile signal is received during transmission of the outgoing message, the present device is reset to standby mode as is shown below. The outgoing message signals are transmitted to the phone line via amplifiers 7 and 8, but part of the outgoing message signals are applied to adder amplifier circuit 10 via two simultaneous paths. The first path is via the tertiary winding (T) of line transformer LT, the secondary winding (S) of line transformer LT, capacitor C1, and resistor R2 to adder amplifier circuit 10. The second path is via reverse amplifier circuit 9 and resistor R7 to adder amplifier circuit 10.

The outgoing message signals at points P1 and P2 are of opposite phase due to reverse amplifier circuit 9. Therefore, these signals cancel each other and are not applied to adder amplifier circuit 10. On the other hand, incoming signals from the telephone line (external signals) are amplified by adder amplifier circuit 10.

The subroutine shown in FIG. 2 is invoked when these external signals are applied to interrupt terminal INT via line transformer LT, adder amplifier circuit 10, and zero cross switch 11.

The situation wherein an external signal consists of an intermittent ringing such as a facsimile CNG tone, is described as follows. Step 110 is affirmative because there is an external signal. Thus control proceeds to Step 111. Step 111 is affirmative because the flag F0 had been set to "0" when power was first applied to CPU-1.

After the above flag F0 is set to "1" at Step 112, TIMER, which is built into CPU-1, is cleared at Step 113. Next, the RAM address is incremented by 1 at Step 114. The value of TIMER is stored in this RAM. For convenience's sake, the RAM address into which the first value of TIMER is stored will be designated as RAM-1. The second value of TIMER is stored in RAM-2 and so on. (Refer to FIG. 4)

Step 115 is negative if the above RAM address is 5 or less. Since the address at this time is actually equal to 1, Step 115 is negative and control proceeds to Step 116 wherein TIMER is started. Control then returns to Step 110.

Figure 4:
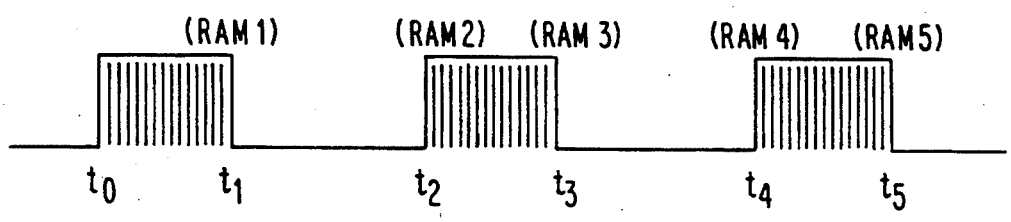
FIG. 4 illustrates waveform of an intermittent ringing signal such as a CNG tone.

In FIG. 4, t0–t1, t2–t3 and t4–t5 are a series of pulse signals which are scanned at a fixed interval. There is a case that no signals are detected because of the timing of the scanning. In this embodiment, accordingly, if no signals are detected for 3 milliseconds or more, it is considered to be a silent interval. The intervals t1–t2 and t3–t4 represent such silent intervals.

Since interval t0–t1 in FIG. 5 is regarded as an external signal, Step 110 is affirmative. Step 111 is negative because the flag F0 had been set to "1" at Step 112 during the previous loop. Control advances to Step 117 where the value of TIMER is stored in the above mentioned RAM-1. For reasons to be explained later, flag F1 is reset to "0" at Step 118 before control returns to Step 110. As long as the signal in interval t0–t1 continues, a loop will be formed from Steps 117, 118, 110 and 111.

At t1 shown in FIG. 4, time interval data for t0–t1 is in RAM-1. When the scanning enters the silent interval after t1, the above mentioned Step 110 is negative and control switches to Step 119.

Since flag F1 had been set earlier to "0" at Step 118, Step 119 is affirmative. At Step 120, flag F1 is set to 1. At Step 121, TIMER is cleared. At Step 122, the RAM address is incremented by 1. At Step 123, TIMER is restarted.

After TIMER is started, time interval data for t1–t2 is entered into RAM-2 at Step 124 in a manner similar to that of t0–t1. When scanning for t1–t2 is concluded, the present device switches to scanning t2–t3. In a manner similar to that illustrated above, the value of TIMER corresponding to t2–t3 is entered into RAM-3.

Finally, the value of TIMER corresponding to t4–t5 is entered into RAM-5. Next, Step 115 is affirmative because at that time the RAM address is 6, and control will advance to Step 126.

At Steps 126 through 128, tests are performed to determine whether or not the TIMER values indicate an intermittent periodic ringing such as a CNG tone and a handshaking signal. If the TIMER values for t0–t1 (RAM-1), t2–t3 (RAM-3) and t4–t5 (RAM-5) are all equal to each other, and TIMER values for t1–t2 (RAM-2) and t3–t4 (RAM-4) are equal, then at Step 129 relay Y-1 is turned off before control is returned to Step 100, where the device is reset to standby mode.

On the other hand, if the external signal is voice, the TIMER values of RAM-1 through RAM-5 are not equal. Consequently, there will be one or more negative results in the Steps 126, 127 and 128. Then, the subroutine is merely exited via Step 1 30 and the present device continues its operation, whether that be transmitting the outgoing message or recording an incoming message.

It should be noted that in the program of the present embodiment, processing is performed so that in the above Steps 126 through 128, intervals within a 10 percent dispersion are considered to be equal.

Since the present invention has a detection means which recognizes an intermittent periodic ringing such as a CNG tone or a handshaking signal from facsimile machines, it can prevent the unwanted utilization of telephone lines as well as unnecessary consumption of recording medium. Furthermore, since the above detection device can also be used to recognize "busy" tones, it is a very efficient invention as well.

What is claimed is:

1. Apparatus for receiving external signals from a telephone line comprising:

answering means responsive to said external signals for supplying an outgoing message to said telephone line and for recording an incoming message from said telephone line, detection means coupled to said telephone line for detecting a predetermined component of said external signals, and means responsive to said detection means detecting said predetermined component for inhibiting operation of said answering means, wherein said detecting means comprises:

first timing means responsive to said external signals for determining silent time intervals when no signals are detected in said telephone line, second timing means responsive to said external signals for determining active time intervals between each two successive intervals of said silent time intervals, first comparison means for comparing said silent time intervals with one another, and second comparison means for comparing said active time intervals with one another, and said inhibiting means is activated when said first comparison means determines that a first predetermined number of said silent time intervals are equal to one another and said second comparison means determines that a second predetermined number of said active time intervals are equal to one another.

2. The apparatus of claim 1, wherein said detecting means further comprises memory means for storing values corresponding to said silent and active time intervals.

3. The apparatus of claim 1, wherein said detection means detects a non-voice signal received from said telephone line.

4. The apparatus of claim 1, wherein said detection means detects a facsimile signal received from said telephone line.

5. The apparatus of claim 1, wherein said inhibiting means restores a standby mode of operation of said answering means.

6. A method of receiving external signals from a telephone line comprising the steps of:

supplying said telephone line with an outgoing message and recording an incoming message from said telephone line in response to said external signals, detecting a predetermined component of said external signals, and inhibiting said operations of supplying the outgoing message and recording the incoming message in response to detecting said predetermined component, wherein said step of detecting comprises:

determining silent time intervals when no signals are detected in said telephone line after receiving each of said external signals, determining active time intervals between each two successive intervals of said silent time intervals, comparing said silent time intervals with one another, and comparing said active time intervals with one another, and said step of inhibiting is initiated when a first predetermined number of said silent time intervals are equal to one another and a second predetermined number of said active time intervals are equal to one another.

7. The method of claim 6, wherein said step of detecting comprises storing values corresponding to said silent and active time intervals.

* * * * *